United States Patent Office 3,004,967
Patented Oct. 17, 1961

3,004,967
PROCESS FOR THE PRODUCTION OF 3β-HYDROXY-16α,17α-EPOXY-5-PREGNEN-20-ONE
Luis E. Miramontes, Mexico City, Mexico, assignor to G. D. Searle & Co., Chicago, Ill., a corporation of Delaware
No Drawing. Filed Mar. 25, 1959, Ser. No. 801,699
7 Claims. (Cl. 260—239.55)

The present invention relates to a highly useful chemical intermediate and, more particularly, to 3β-acetoxy-16α-bromo-5-pregnen-20-one.

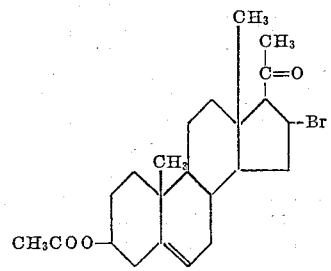

This compound can be conveniently prepared by the slow addition of one mole of hydrogen bromide to 3β-acetoxy-5,16-pregnadien-20-one. Suitable solvents are halogenated alkanes and particularly polyhalogenated methane and ethane, e.g. dichloroethane, chloroform, dichloromethane and the like. It has been found that if the addition is conducted substantially in the range between −10° C. and +10° C., typically close to 0° C., and if the addition of the hydrogen bromide is conducted slowly so as to avoid high concentration, the hydrobromination of the 16(17) double bond is practically exclusive of that of the 5(6) double bond. With slow addition at a temperature between 0° C. and +2° C., no reaction has been observed to occur at the 5(6) position. The 16α-bromo compound thus produced is easily isolated from the reaction mixture by conventional procedures.

3β-acetoxy-16α-bromo-5-pregnen-20-one can also be produced by the direct hydrobromination of 3β-acetoxy-16β-(γ-methyl δ-acetoxypentanoyloxy) - 5 - pregnen-20-one, in which the 3β-acetoxy-5,16-pregnadien-20-one is present as an unisolated intermediate. In fact, it has been found that even the 3β-acetoxy-16β-(γ-methyl-δ-acetoxypentanoyloxy)-5-pregnen-20-one does not have to be isolated, but that the hydrohalogenation may be conducted directly on a solution of the conventional chromic acid oxidation product of pseudodiosgenin.

3β-acetoxy-16α-bromo-5-pregnen-20-one is a convenient valuable intermediate in the preparation of therapeutically active hormones. Its simple preparation in pure form presents numerous advantages in the recognized procedures for converting the naturally occurring sapogenins, such as diosgenin, into valuable therapeutic steroids such as progesterone. It has been found that an alcoholic solution of 3β-acetoxy-16α-bromo-5-pregnen-20-one in a suitable solvent, preferably dichloromethane, can be reduced with zinc dust and acetic acid simply by heating. The reaction can be catalyzed by the addition of a small amount of sodium or potassium iodide. Saponification of the 3β-acetoxy group by conventional methods affords 3β-hydroxy-5-pregnen-20-one in both excellent yield and quality. This compound is then converted to progesterone by the conventional Oppenauer oxidation process. On chromatographic assay, progesterone produced by this process fails to show any admixture of the allopregnane derivative which indicates that no reduction of the 5(6) double bond has taken place. The direct catalytic hydrogenation of a 3β-acetoxy-5,16-pregnadien-20-one ordinarily results in the formation of both isomeric derivatives.

3β-acetoxy-16α-bromo-5-pregnen-20-one can also be employed in the preparation of 3β-acetoxy-16α,17α-epoxy-5-pregnen-20-one merely by reacting it with an alcoholic solution of hydrogen peroxide in the presence of alkali. Good solubility of the acetate in methanol is a special advantage in this process. The epoxide is conveniently converted to 17α-hydroxyprogesterone by Oppenauer oxidation, treatment with hydrogen bromide in acid solution, and removal of the bromine atom in alcoholic solution in the presence of a suitable catalyst, preferably Raney nickel.

The 16(17) double bond may be reintroduced by heating the bromosteroids of this invention in an alkaline solution of a suitable solvent such as dioxane.

The following examples describe in detail certain of the methods used in the present invention. However, the invention is not to be construed as limited thereby either in spirit or in scope. It will be apparent to those skilled in the art of organic synthesis that many modifications, both of materials and methods, may be practiced without departing from the purpose of this invention. In these examples the temperatures are given in degrees centigrade (° C.) and amounts of materials in parts by weight.

Example 1

To a solution of 100 parts of 3β-acetoxy-5,16-pregnadiene-20-one in 465 parts of dichloromethane, maintained at substantially 0° C., is added hydrogen bromide gas at such a rate so that in one hour there is absorbed 1 mole of hydrogen bromide for every mole of steroid. The solution is then agitated for an additional hour and concentrated to dryness by vacuum distillation. The white crystalline residue is taken up in ice cold ether, filtered, and washed with ether. Upon recrystallization from ethyl acetate, there is obtained 3β-acetoxy-16α-bromo-5-pregnen-20-one melting at about 158–159.5° C. with decomposition. The specific rotation in chloroform is −9.5°.

Example 2

A solution of the chromic acid oxidation product of pseudo-diosgenin is extracted repeatedly with dichloromethane. The extracts are washed to neutrality with water. The dichloromethane solution (containing 3β-acetoxy 16β-(γ-methyl-δ-acetoxypentanoyloxy)-5 - pregnen - 20- one) is then agitated with a sufficient amount of potassium carbonate to form a suspension, and filtered. The filtrate is concentrated on a steam bath. The solution is cooled to 0° C. and hydrogen bromide gas is passed slowly through it for an hour. After agitation for an additional hour, the solution is concentrated to dryness by vacuum distillation. The white crystalline residue is taken up in ice cold ether, filtered, and washed with ether. Upon recrystallization from ethyl acetate there is obtained 3β-acetoxy-16α-bromo-5-pregnen-20-one melting at about 158–159.5° C. with decomposition.

Example 3

A solution of 5 parts of 3β-acetoxy-16α-bromo-5-pregnen-20-one is refluxed with 20 parts of pyridine for 1 hour and is then poured into water. The crystals which precipitate are collected on a filter and recrystallized from a solution of dichloromethane and methanol to yield 3β-acetoxy-5,16-pregnadien-20-one melting at about 173–175°C.

Example 4

A solution of 10 parts of 3β-acetoxy-16α-bromo-5-pregnen-20-one in 104 parts of dichloromethane is cooled to 5° C. Then 80 parts of a saturated solution of hydrogen chloride in methanol is added. The temperature is maintained at about 30° C. for 30 minutes. Approximately 1000 parts of water are added and the organic layer is separated. The yield can be increased by reextracting the remaining layer with dichloromethane. The dichloromethane extracts are then combined and washed with water to neutrality. A small amount of methanol is added and the solution is vacuum distilled to dryness. Upon recrystallization from ethyl acetate there is obtained 3β-hydroxy-16α-bromo-5-pregnen-20-one.

*Example 5*

To a solution of 10 parts of 3β-acetoxy-16α-bromo-5-pregnen-20-one in 80 parts of dioxane is added a solution of 4 parts of potassium hydroxide in 80 parts of water. The mixture is refluxed for 30 minutes and then 90 additional parts of water are added and the refluxing continued for an additional 15 minutes. Upon cooling to approximately 10° C., a precipitate appears. This precipitate is filtered and washed with water. In this manner there is obtained 3β-hydroxy-5,16-pregnadien-20-one melting at about 208–214° C.

*Example 6*

A solution of 10 parts of 3β-acetoxy-16α-bromo-5-pregnen-20-one in 104 parts of chloroform is added to 88 parts of methanol and the temperature is maintained at about 15° C. while a 30% solution of 19.5 parts of hydrogen peroxide is added. In the course of 30 minutes a solution of 3.6 parts of sodium hydroxide and 15 parts of water is added portionwise, the temperature being kept below 20° C. The mixture is then agitated at room temperature for about 8 hours. Water is added until turbidity appears, and the precipitate is extracted with chloroform. The chloroform extracts are combined and concentrated to dryness.

A solution of 1 part of 3β-hydroxy-16α,17α-epoxy-5-pregnen-20-one in 4 parts of acetic anhydride and 4 parts of pyridine is heated on a steam bath in a nitrogen atmosphere for an hour and then treated with ice. The solid precipitate is collected on a filter and recrystallized successively from aqueous methanol and petroleum ether. The 3β-acetoxy-16α,17α-epoxy-5-pregnen-20-one thus obtained melts at about 155–158° C.

*Example 7*

To an agitated solution of 10 parts of 3β-acetoxy-16α-bromo-5-pregnen-20-one in 104 parts of dichloromethane, 32 parts of methanol and 10.4 parts of glacial acetic acid, there are added in the course of 7 hours 6 parts of zinc dust. Then 1 additional part of zinc dust is added and the mixture is agitated for 15 hours at room temperature. The resulting zinc slurry is then filtered and water is added to the filtrate. The organic layer is separated and concentrated on a steam bath. About 80 parts of methanol are added to the residue, and the solution is concentrated to a volume of approximately 40 parts. Upon cooling, a precipitate appears, which is collected on a filter and washed with a small amount of methanol. In this manner there is obtained 3β-acetoxy-5-pregnen-20-one melting at about 145–147° C.

The reaction can be greatly accelerated if one part of sodium or potassium iodide is added to the initial reaction mixture. The reaction is thus completed within about 7 hours.

What is claimed is:

1. A process for the preparation of 3β-acetoxy-16α-bromo-5-pregnen-20-one which comprises the slow addition of one molecular equivalent of hydrogen bromide, so that at no time there is an excess of hydrogen bromide in the solution, to 3β-acetoxy-5,16-pregnadien-20-one at a temperature range substantially between −10 and +10° C. in a polychloroalkane solvent of less than 3 carbon atoms.

2. A process for the preparation of 3β-acetoxy-16α-bromo-5-pregnen-20-one which comprises the slow addition of one molecular equivalent of hydrogen bromide, so that at no time there is an excess of hydrogen bromide in the solution, to 3β-acetoxy-5,16-pregnadien-20-one at a temperature range substantially between −10 and +10° C. in dichloromethane.

3. The process for the preparation of 3β-acetoxy-16α-bromo-5-pregnen-20-one which comprises the slow addition of one equivalent of hydrogen bromide, so that at no time there is an excess of hydrogen bromide in the solution, at a temperature range substantially between −10 and +10° C. to 3β-acetoxy-16β-(γ-methyl-δ-acetoxypentanoyloxy)-5-pregnen-20-one in a polychloroalkane solvent of less than 3 carbon atoms.

4. A process according to claim 3 wherein the 3β-acetoxy-16β-(γ-methyl-δ-acetoxypentanoyloxy)-5-pregnen-20-one is present as an unisolated intermediate in the acid oxidation of pseudodiosgenin in dichloromethane.

5. A process for the preparation of 3β-acetoxy-16α-bromo-5-pregnen-20-one which comprises the slow addition of one molecular equivalent of hydrogen bromide, so that at no time there is an excess of hydrogen bromide in the solution, to 3β-acetoxy-5,16-pregnadien-20-one at a temperature range substantially between −10 and +10° C. in a polychloroalkane solvent of less than 3 carbon atoms and hydrogenation of the 3β-acetoxy-16α-bromo-5-pregnen-20-one produced by stirring with zinc powder in the presence of acid.

6. A process for the preparation of 3β-acetoxy-16α-bromo-5-pregnen-20-one which comprises the slow addition of one molecular equivalent of hydrogen bromide, so that at no time there is an excess of hydrogen bromide in the solution, to 3β-acetoxy-5,16-pregnadien-20-one at a temperature range substantially between −10 and +10° C. in a polychloroalkane solvent of less than three carbon atoms and hydrogenation of the 3β-acetoxy-16α-bromo-5-pregnen-20-one product by stirring with zinc powder in the presence of an alkali metal iodide in the presence of acid.

7. The process for the preparation of 3β-hydroxy-16α,-17α-epoxy-5-pregnen-20-one which comprises the slow addition of one equivalent of hydrogen bromide, so that at no time there is an excess of hydrogen bromide in the solution, at a temperature range substantially between −10 and +10° C. to 3β-acetoxy-5,16-pregnadien-20-one and stirring the 3β-acetoxy-16α-bromo-5-pregnen-20-one thus formed in lower alkanol solution with alkaline hydrogen peroxide.

References Cited in the file of this patent

UNITED STATES PATENTS 2,745,850    Farrar  ------------------ May 15, 1956